(12) United States Patent
Wislinski (10) Patent No.: US 6,330,390 B1
(45) Date of Patent: Dec. 11, 2001

(54) DEVICE FOR WINDING OPTICAL FIBERS

(75) Inventor: Martin T. Wislinski, Edison, NJ (US)

(73) Assignee: TyCom (US), Inc., Morristown, NJ (US)

( * ) Notice: Subject to any disclaimer, the term of this patent is extended or adjusted under 35 U.S.C. 154(b) by 0 days.

(21) Appl. No.: 09/460,395

(22) Filed: Dec. 13, 1999

(51) Int. Cl.[7] ........................................ G02B 6/00
(52) U.S. Cl. ................ 385/135; 242/174; 242/472.7; 242/920
(58) Field of Search ...................... 385/134, 135, 385/136, 137; 242/118, 159, 169, 172, 174, 472.7, 613.3, 920

(56) References Cited

U.S. PATENT DOCUMENTS

| | | | |
|---|---|---|---|
| 5,029,960 | * | 7/1991 | Hulderman et al. ............... 385/134 |
| 5,371,593 | * | 12/1994 | Cordova et al. ................... 356/350 |
| 5,486,922 | * | 1/1996 | Cordova ............................. 356/350 |
| 5,712,943 | * | 1/1998 | Atar et al. ......................... 385/134 |
| 6,014,713 | * | 1/2000 | Agnew et al. ..................... 385/134 |

* cited by examiner

Primary Examiner—Cassandra Spyrou
Assistant Examiner—Euncha Cherry (57) ABSTRACT

A device is disclosed for winding an optical fiber. The device includes a mandrel that is connected to a brace. In an operative mode, the brace engages a stabilizer and the stabilizer is releasably fastened to an optical fiber storage assembly. The stabilizer can be releasably fastened to a spool, a hub, or a tray.

8 Claims, 7 Drawing Sheets

DEVICE FOR WINDING OPTICAL FIBERS

FIELD OF THE INVENTION

The present invention relates to the field of optical fiber storage systems and, more particularly, to a device for winding optical fibers.

BACKGROUND OF THE INVENTION

Submarine fiber optic communication systems carry a large majority of the information that is transmitted between the world's continents. These fiber optic communication systems remain in-place on the bottom of the ocean under thousands of feet, and even miles, of water for many years. Due to the difficulties encountered when having to repair, replace, or generally service these systems, it is desirable that these systems be highly reliable.

Submarine fiber optic communication systems typically include repeaters that appear at regular intervals along the spans of undersea cables to amplify the optical signals traversing the constituent fibers. Other assemblies that may be found along a submarine communication system including branching units, which allow multiple cable stations to be served from a single cable. To protect the sensitive components and/or connections that are housed within these submerged assemblies, a rugged hermetically sealed structure must be employed.

Typically, the optical fibers found within optical repeaters are circular in cross-section, and are constructed of glass surrounded by a protective jacket that is thicker than the glass. For example, a typical glass fiber, which may be referred to as a "glass fiber", "bare fiber", or "unjacketed fiber", can have an outer diameter of approximately 0.010 inches, and a typical jacketed fiber can have an outer diameter of approximately 0.040 to 0.060 inches.

The glass fiber is relatively fragile. Because even microscopic damage to the glass fiber can adversely affect the reliability of the optical repeater (and, as a result, the reliability of the entire submarine optical fiber cable system), care is normally taken to protect the glass fiber from damage. Generally, the likelihood of damage to the glass fiber can be reduced by ensuring that any curvature in the glass fiber meets or exceeds the minimum bending radius of the glass fiber. However, the minimum bending radius of the glass fiber is a function of the expected life of the glass fiber. For example, when at least a 25-year life is expected, the glass fiber typically has a minimum bending radius of approximately 1 inch. This is referred to as the reliability-adjusted minimum bending radius of the glass fiber, because meeting or exceeding this value provides acceptable reliability from bending damage during the expected life of the glass fiber.

Typically, the optical components found within optical repeaters are manufactured with a segment of optical fiber attached at each end and cut to a specified length. Each fiber segment contains a jacketed portion of specified length located adjacent to the optical component, and a bare portion of specified length extending from the opposite end of the jacketed portion. The bare portion is spliced into the bare portion of another segment in the repeater's optical circuit. Creating these splices can be a complicated task, requiring substantial lengths of bare fiber on each side of the splice. Optimally however, the repeater or branching station is designed to be as space-efficient as possible, thereby minimizing its production, storage, shipping, and installation costs. Thus, it is desirable to store each optical fiber segment in the most space-efficient manner possible.

Typically, this involves storing the fiber in a coiled configuration on a tray upon which are mounted at least some of the optical components served by that fiber. Typical trays include a well that extends partially through the thickness of the tray, and an elongated circular spool surrounded by the well. A gap between the spool and the well defines a fiber storage space within which the coiled fibers can be stored.

Delivering a fiber to the fiber storage space typically involves resting an elongated annular mandrel upon the top of the spool, and winding the fiber around the mandrel. Then, the fiber is urged down the mandrel and into the storage space. Both the mandrel and the spool typically have outer diameters that at least meet the reliability-adjusted minimum bending radius of the fiber.

There are numerous disadvantages to the known mandrel. For example, because the mandrel is typically only supported by its bearing down upon the top of the spool, the known mandrel is likely to tip over when a fiber is being wound therearound. This tipping can cause the mandrel to fall upon one or more fibers or optical components, potentially causing damage to a fiber or component that may not be apparent until after the optical repeater or branching station has been placed in service.

Also, the known mandrel is dimensioned to position the wound fiber over the fiber storage space, but very close to the spool. This positioning can cause the fiber to bunch-up around the spool when urged off the mandrel. Bunching of the fiber can cause the fiber to inhabit substantially more of the storage area's vertical dimension than is necessary, thus preventing the maximum number of fibers from being stored in the storage area.

SUMMARY OF THE INVENTION

Embodiments of the present invention provide a device for winding an optical fiber. In an embodiment, the device includes a mandrel that is adapted to releasably fasten to an optical fiber storage assembly.

BRIEF DESCRIPTION OF THE DRAWINGS

The invention will be more readily understood through the following detailed description, with reference to the accompanying drawings, in which.

DETAILED DESCRIPTION

Embodiments of the present invention provide a device for winding an optical fiber. In one embodiment, the device includes a mandrel that is adapted to releasably fasten to an optical fiber storage assembly.

As used herein, the term "winding" can include winding, coiling, spooling, or wrapping. The term "optical fiber" can include any type of optical fiber in any system or component. For example, the optical fiber can be used in a submarine optical repeater or branching station.

The term "mandrel" can include any device or combination of devices that define a winding surface upon which an optical fiber can be wound prior to transferring the optical fiber into a storage space, such that any curvature formed in the optical fiber by the winding meets or exceeds the optical fiber's reliability-adjusted minimum bending radius. The term "fasten" can include joining or affixing in a rigid manner, so as to prevent movement between the fastened entities. For example, the mandrel can thread or wedge into the optical fiber storage assembly. In addition, the mandrel can be latched onto the optical fiber storage assembly.

The term "storage space" can include any volume intended to store a optical fiber after winding. The term "central portion" can include any volume within the storage space that does not directly contact a spool or a restrainer, such as a well.

Figure 1:
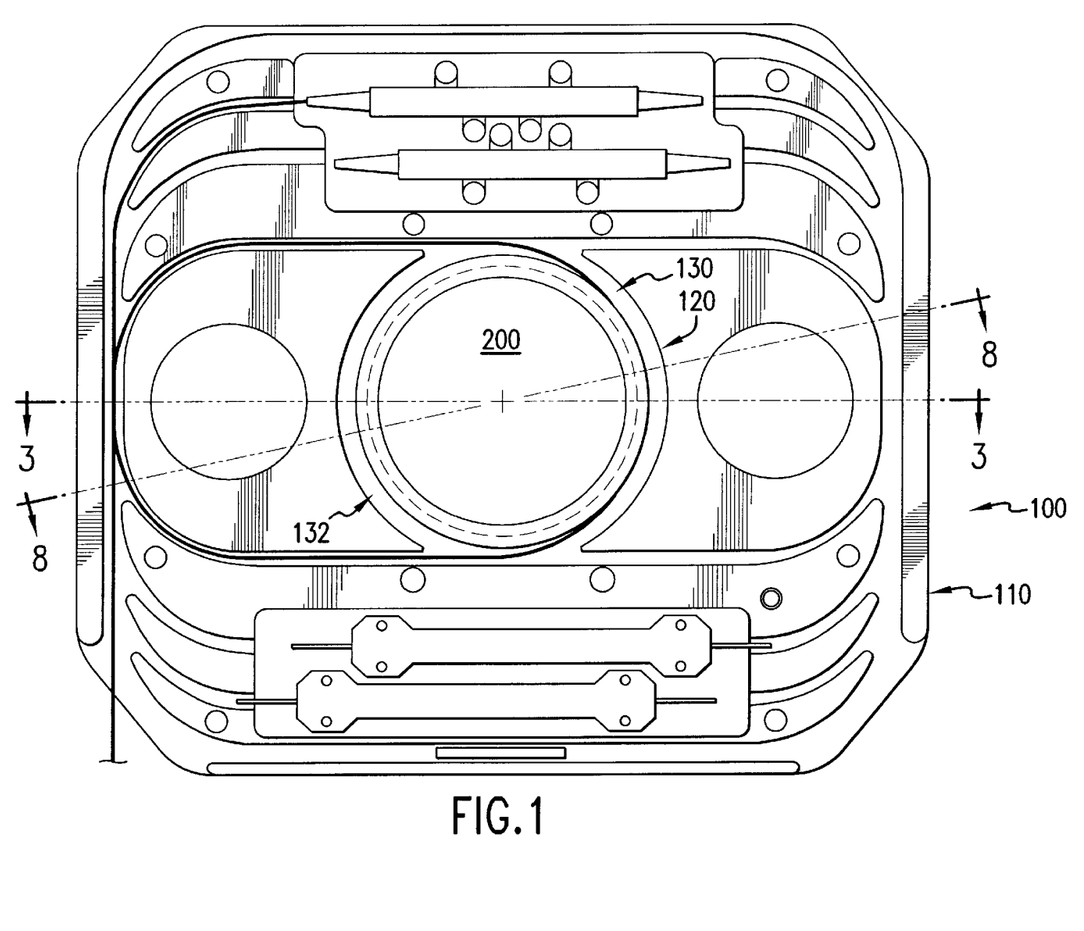
FIG. 1 is a top view of an embodiment of the mandrel of the present invention as utilized with an optical fiber storage assembly.

FIG. 1 is a top view of an embodiment of a mandrel in accordance with the principles of the present invention as utilized in an optical fiber storage assembly 100. Optical fiber storage assembly 100 can include tray 110, which can include an elongated generally circular fiber storage well 120. Well 120 can surround an elongated generally annular spool 170 (not visible in FIG. 1), which can be connected to, or integral to, tray 110. Between well 120 and spool 170 can be elongated generally annular fiber storage space 130. Fiber winding device 200 can be releasably fastened to fiber storage assembly 100, such that fiber winding device 200 extends generally upwards from fiber storage assembly 100, and above fiber storage well 120, spool 170, and fiber storage space 130. Fiber winding device 200 can have a circular profile, the outermost circumference of which can extend over a central portion 132 of space 130.

Figure 2:
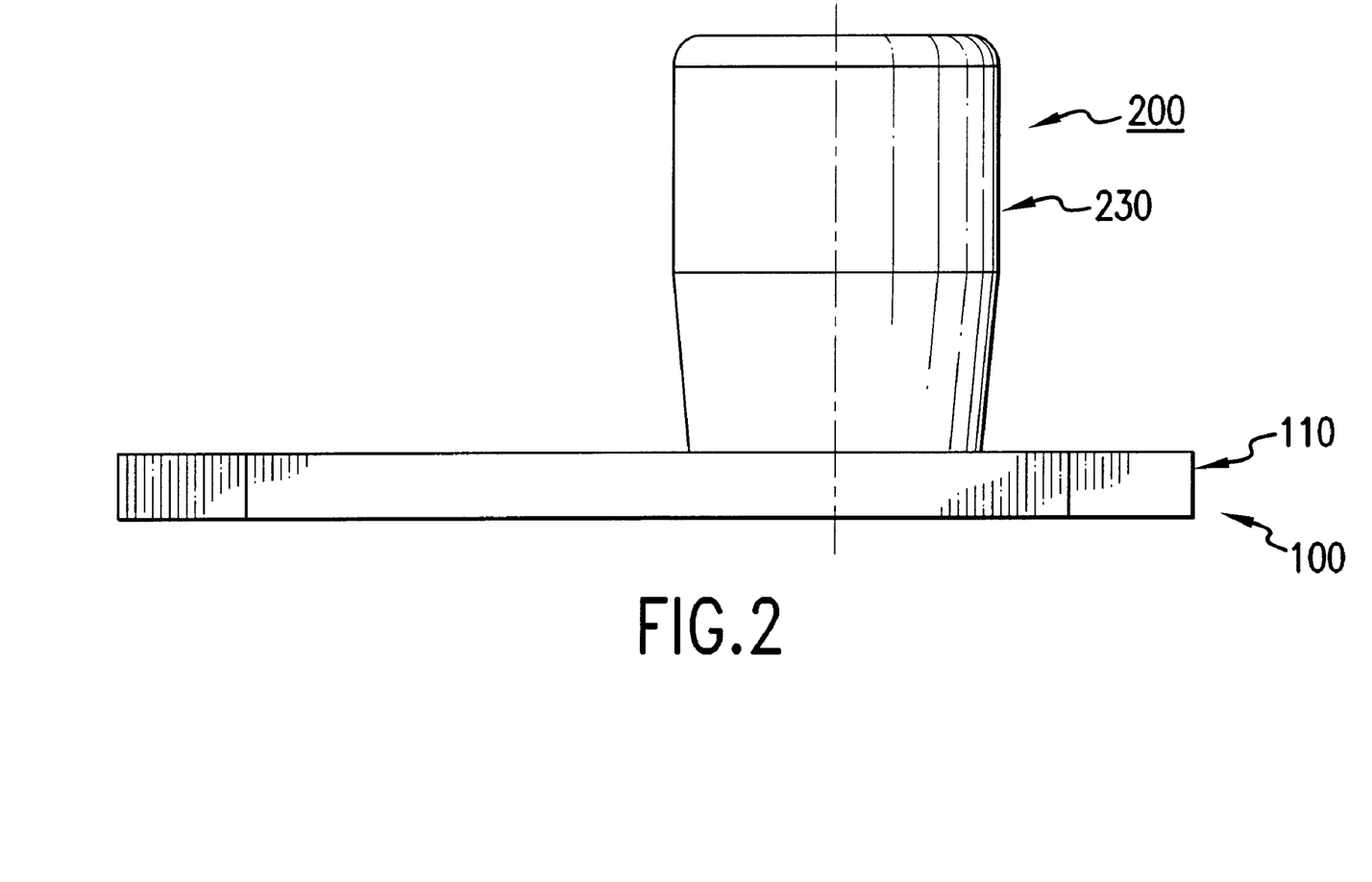
FIG. 2 is a side view of the mandrel and optical fiber storage assembly shown in FIG. 1.

FIG. 2 is a side view of fiber winding device 200 and tray 110. Fiber winding device 200 can include mandrel 230. Mandrel 230 can rest upon and thus be supported by fiber storage assembly 100. Mandrel 230 can extend above tray 110 sufficiently to allow an assembler to wind optical fibers around mandrel 230. Although not visible in FIG. 2, fiber winding device 200 can also include brace 240, and stabilizer 250.

Figure 3:
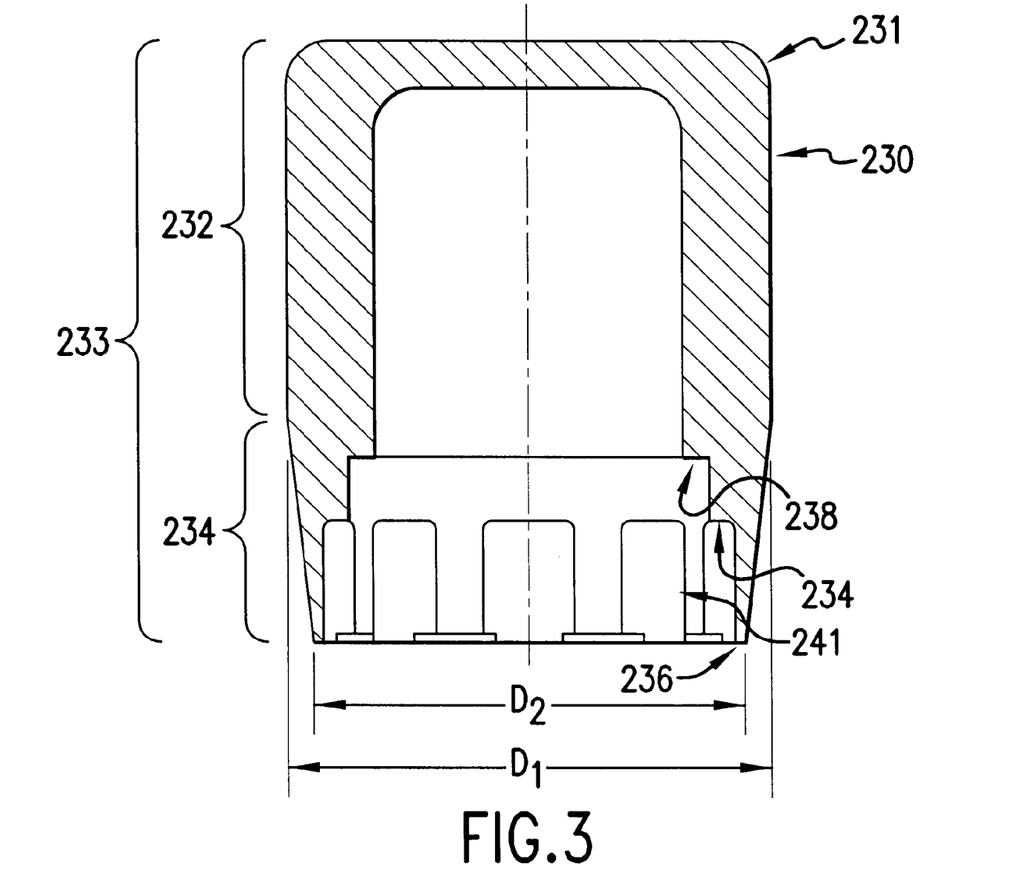
FIG. 3 is a cross-sectional view of the mandrel as taken along line 3—3 of FIG. 1.

FIG. 3 is a cross-sectional view of mandrel 230 as taken along line 3—3 of FIG. 1. Along its outer circumference, mandrel 230 can have fiber surface 233, which can include winding surface 232 and disengagement surface 234. The diameter of winding surface 232 is shown as $D_1$, which is constant, or very nearly so, along the length of winding surface 232. However, the diameter of winding surface 232 can be either constant or variable.

The diameter of disengagement surface 234 is illustrated as tapering linearly from a value of approximately $D_1$ at the location where disengagement surface 234 meets winding surface 232, to a value of approximately $D_2$ at the location where disengagement surface 234 meets mandrel bottom 236. However, the diameter of disengagement surface 234 can vary in other manners, e.g., non-linearly or step-wise, between where disengagement surface 234 meets winding surface 232 and where disengagement surface 234 meets mandrel bottom 236. Nevertheless, the diameters of disengagement surface 234 and winding surface 232 can at least meet the reliability-adjusted minimum bending radius of any fibers coiled therearound.

The top edge 231 of mandrel 230 can be shaped, thereby avoiding sharp corners that could damage a fiber or injure an assembler. Mandrel 230 can include a plurality of grooves 241 that can accommodate movement of the arms of separator 150 (not visible in FIG. 3). Mandrel 230 can include support surfaces such as mandrel bottom 236, mandrel bottom lip 237, and/or inner ledge 238, that can rest upon, and thus be supported by fiber storage assembly 100 (not shown in FIG. 3).

Although not all visible in FIG. 3, the components of fiber winding device 200 can include mandrel 230, brace 240, and stabilizer 250.

Figure 4:
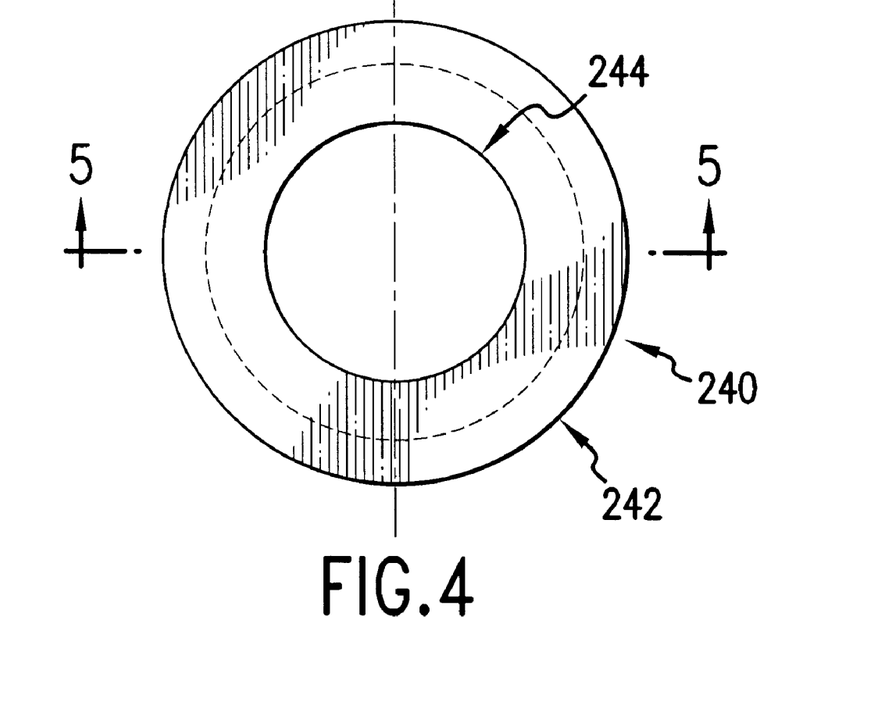
FIG. 4 is a top view of a brace of an embodiment of the mandrel.

FIG. 4 is a top view of brace 240. Brace 240 can be a generally elongated annular shape having an outer circumference 242 that can engage with mandrel 230 (not shown in FIG. 4), and an inner circumference 244 that can engage with stabilizer 250 (not shown in FIG. 4).

Figure 5:
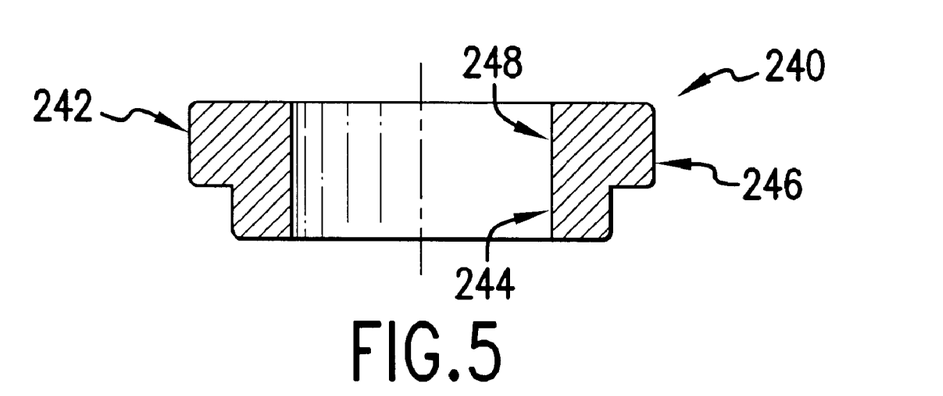
FIG. 5 is a cross-sectional view of the brace as taken along line 5—5 of FIG. 4.

FIG. 5 is a cross-sectional view of brace 240 as taken along line 5—5 of FIG. 4. Brace 240 can include outer bearing surface 246 along outer circumference 242. Brace 240 can also include inner bearing surface 248 along inner circumference 244.

Figure 6:
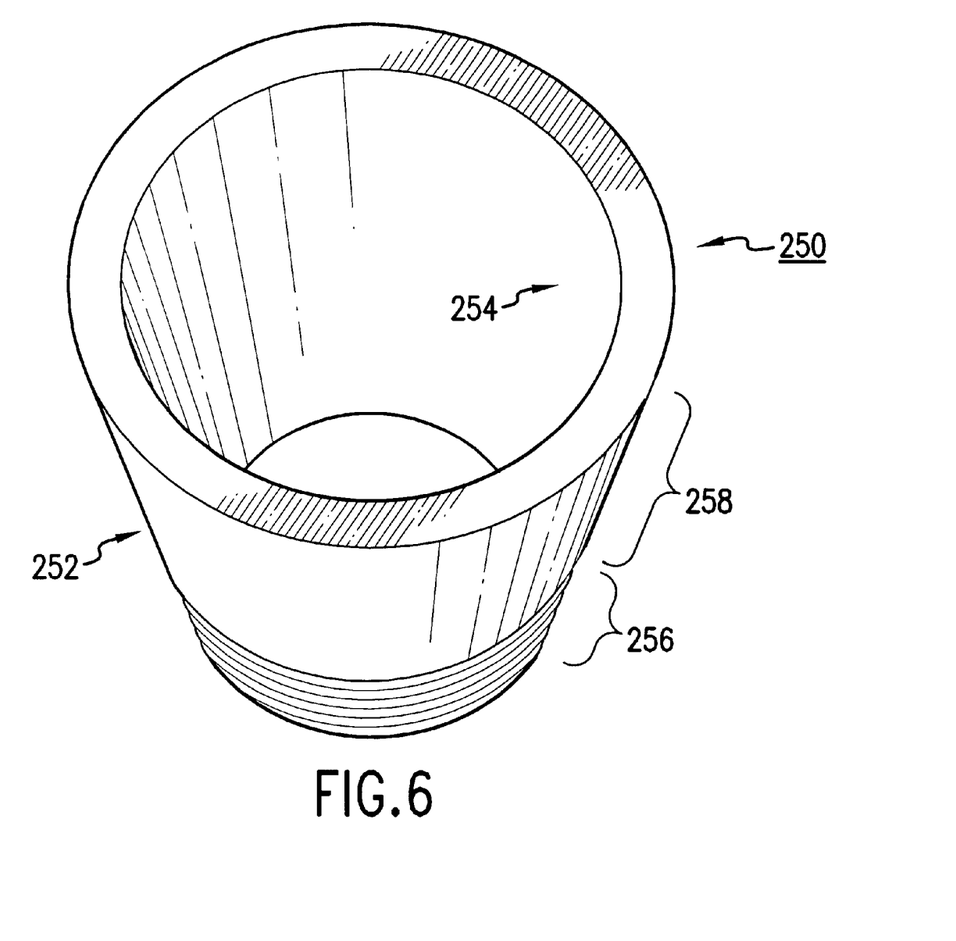
FIG. 6 is a perspective view of a stabilizer of an embodiment of the mandrel.

FIG. 6 is a perspective view of stabilizer 250. Stabilizer 250 can have an elongated generally annular shape. Thus, stabilizer 250 can include outer circumferential wall 252 which can engage brace 240 (not visible in FIG. 6) along its outer circumference 242. Stabilizer 250 can also include inner circumferential wall 254. Outer circumferential wall 252 can include threaded portion 256. Outer circumferential wall 252 can also include bearing portion 258 positioned above threaded portion 256. In one alternative, stabilizer 250 can be the elongated generally annular pipe 194 disclosed at page 11 in the pending U.S. patent application titled, "Device for Separating Portions of Spooled Optical Fibers", Ser. No. 09/317,827 filed May 25, 1999.

Figure 7:
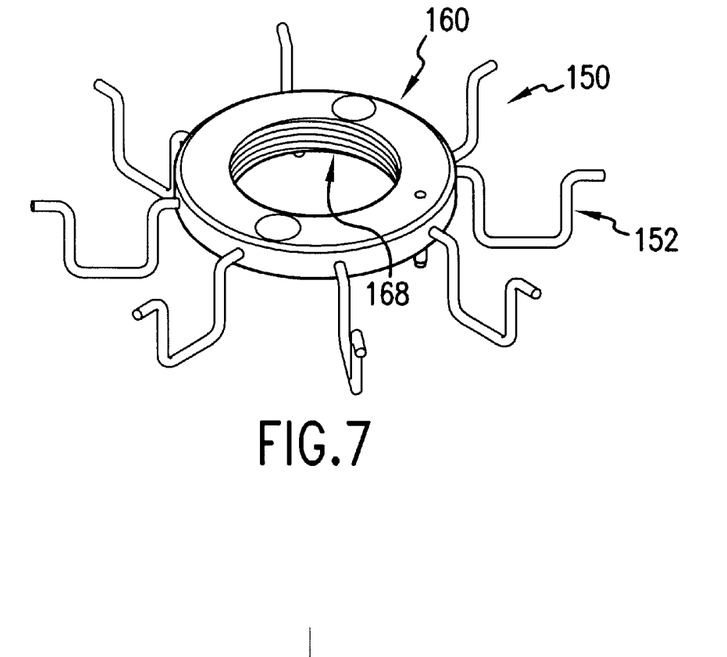
FIG. 7 is a perspective view of a separator assembly which can be used with the mandrel.

FIG. 7 is a perspective view of separator assembly 150, which can be attached to tray 110, and which is described in U.S. patent application titled "Device for Separating Portions of Spooled Optical Fibers", Ser. No. 09/317,827, filed May 25, 1999. Separator assembly 150 can include separator cage 152 and hub 160. Hub 160 can be an elongated generally annular shape. Hub 160 can have a threaded inner circumference 168, which can receive threaded portion 256 of stabilizer 250 (not shown in FIG. 7).

Figure 8:
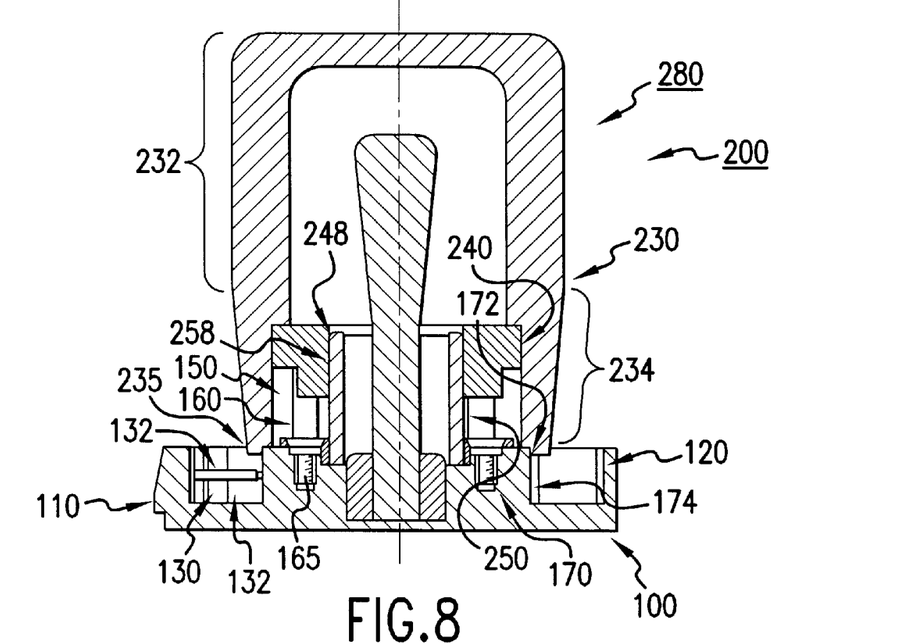
FIG. 8 is a cross-sectional view of the mandrel and the optical fiber storage assembly as taken along line 8—8 of FIG. 1.

FIG. 8 is a cross-section as taken along line 8—8 of FIG. 1. Fiber winding device 200 releasably engage with fiber storage assembly 100. The components of fiber winding device 200 can include mandrel 230, brace 240, and stabilizer 250.

Stabilizer 250 can thread into hub 160 of separator assembly 150. Hub 160 can be attached by screws 165 to spool 170, which can be attached to, or integral to, tray 110. Well 120 can surround spool 170. Separator cage 152 of separator assembly 150 can extend from hub 160, through spool 170, and can meet or overlap well 120.

Brace 240 can engage mandrel 230 to form mandrel assembly 280. Brace 240 can attach to mandrel 230 via, for example, a press-fit, threading, wedging, or an adhesive. Mandrel assembly 280 can surround stabilizer 250 in any of a number of ways, including a sliding fit, a wedge fit, or a threaded fit. The engagement of mandrel 230, brace 240, stabilizer 250, and one or more components of fiber storage assembly 100 can resist or prevent mandrel 230 from tipping or falling onto fiber storage assembly 100.

In operation, mandrel 230 of fiber winding device 200 can provide a winding surface for fibers that will be stored on tray 110. Initially, a cover (not shown) attached to tray 110 can be removed. Any hub cover 161 (not shown in FIG. 4) attached to hub 160 can be unthreaded from hub 160 and set aside. Next, stabilizer 250 can be threaded into hub 160. Then, mandrel assembly 280 can be placed around stabilizer 250 and on top of spool 170 such that top edge 172 of spool 170 bears the weight, and thus supports, mandrel assembly 280. To prevent the tipping of mandrel assembly 280, the inner circumference 248 of brace 240 can bear against the outer circumference 258 of stabilizer 250.

Once fiber winding device 200 has been assembled, fiber can be wound around winding surface 232. The wound fiber can be urged downward along winding surface 232 and onto disengagement surface 234. Because disengagement surface 234 can taper inward toward spool 170, the wound fiber can disengage from mandrel 230 at a location along disengagement surface 234, and then drop into storage space 130.

The bottom 235 of disengagement surface 234 can have a diameter which is greater than the outer diameter 174 of spool 170 and less than the inner diameter of well 120. The outer diameter of winding surface 232 can be approximately equal to the average of the inner diameter of well 120 and the outer diameter 174 of spool 170. Fiber that has been wound around mandrel 230 can be positioned over a central portion 132 of storage space 130, such that when the fiber drops into storage space 130, it can be deposited into central portion 132. Thus, mandrel 230 can facilitate the transfer of a fiber wrapped thereon into central portion 132. Once the fiber is positioned in central portion 132, an operator can spread the fiber horizontally within storage space 130, to minimize any bunching or vertical stacking of the fiber within storage space 130.

Figure 9:
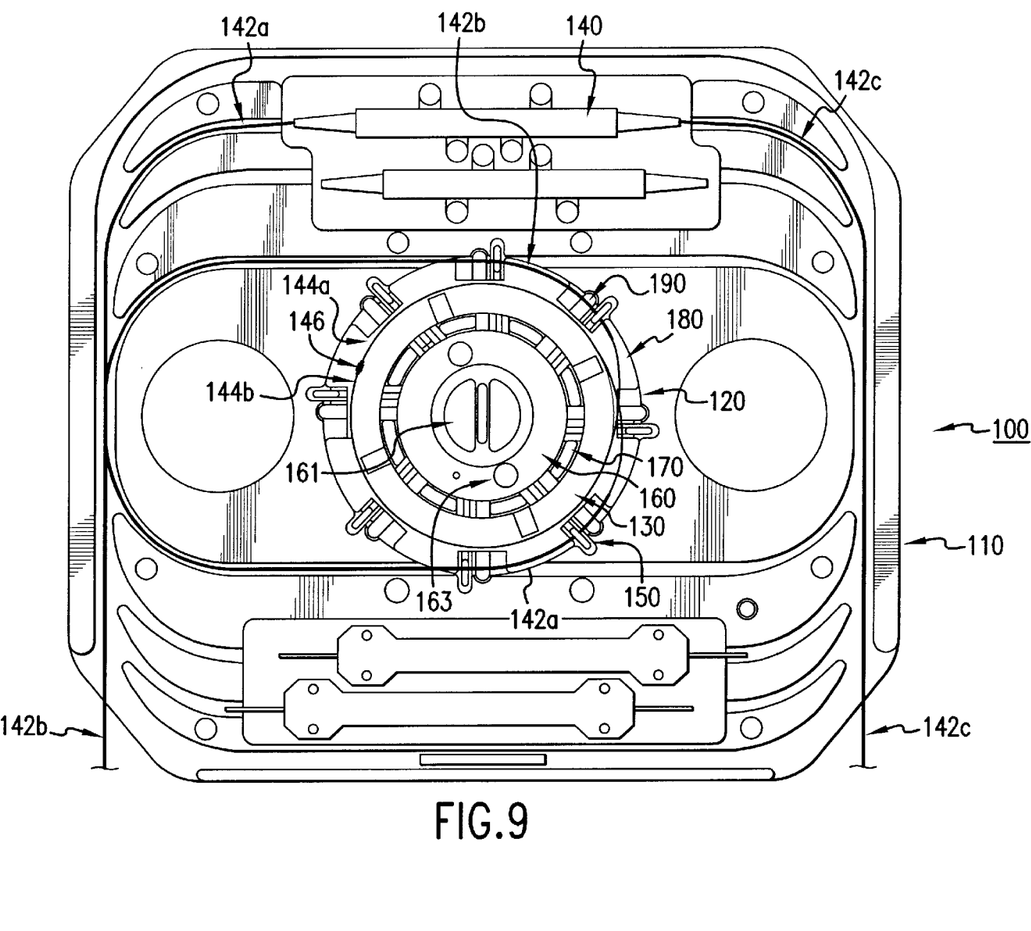
FIG. 9 is a top view of an optical fiber storage assembly with which the mandrel can interact.

FIG. 9 is a top view of a fiber storage assembly 100 with which an embodiment (not shown) of the present invention can interact. Fiber storage assembly 100 can include fiber storage tray 110, which can define an elongated generally circular fiber storage well 120, which can define generally annular fiber storage space 130. Optical device 140 can be mounted to tray 110. Jacketed optical fiber 142a can be connected to one end of optical device 140, and jacketed optical fiber 142c can be connected to the opposite end. Fiber 142c can be routed through and away from tray 110. Fiber 142a can be routed through tray 110 into storage space 130, and behind one or more arms of separator 150, which is described in the U.S. patent application titled "Device for Separating Portions of Spooled Optical Fibers", Ser. No. 09/317,827, filed May 25, 1999, and incorporated here by reference.

Each arm of separator 150 can be attached to hub 160, which can rest on, and be surrounded by, spool 170. Hub 160 can be attached to spool 170 by screws 165 (not shown in FIG. 9) extending through screw holes 163 in hub 160. Of hub cap 161 can be unthreaded from the threaded inner circumference 168 of hub 160 to allow threaded portion 256 (not shown in FIG. 9) of stabilizer 250 (not shown in FIG. 9) to be threaded into hub 160.

Jacketed fiber 142a can be connected to bare fiber 144a, which can connect at splice 146 to bare fiber 144b. Jacketed fiber 142b can be connected to bare fiber 144b. Jacketed fiber 142b can be primarily stored behind one or more arms of separator 150 before exiting storage space 130 and tray 110. Those portions of fibers 142a, 142b, 144a, and 144b that are within well 120 can be supported by, and capped by, secluder system 180, which is described in the U.S. patent application titled "Device for Secluding Optical Fibers", Ser. No. 09/317,826, filed May 25, 1999, now abandoned and incorporated here by reference.

Beneath those portions of fibers 142a, 142b, 144a, and 144b that are within well 120, and beneath secluder system 180 can be lifting device 190, which is described in U.S. patent application titled "Device for Moving a Spooled Stack of Optical Fibers", Ser. No. 09/317,977, filed May 25, 1999, now Pat. No. 6,076,755 and incorporated here by reference.

Referring to FIG. 8, there are advantages of fiber winding device 200 over the known mandrels. For example, because of its anti-tipping structure, fiber winding device 200 can present less of a risk of tipping onto fiber storage assembly 100, an optical component, or a fiber, and thereby damaging the optical fiber system. Specifically, the interaction of brace 240 with stabilizer 250, and the interaction of stabilizer 250 with hub 160, can prevent horizontal forces applied to fiber winding device 200 from tipping it over. Also, the use of fiber winding device 200 can free one of an operator's hands that would otherwise be used during fiber winding to stabilize the mandrel to prevent it from tipping.

Moreover, because optical fiber winding device 200 can position a wound optical fiber over a central portion 132 of storage space 130, and can allow an assembler deliver the wound optical fiber to central portion 132, wound optical fiber can be more easily spread horizontally within storage space 130, thereby the wound optical fiber can take up less of the vertical dimension of storage space 130.

Also, because each wound optical fiber can be more easily spread horizontally within storage space 130, optical fiber winding device 200 can simplify secluding one optical fiber from another, and thereby enabling an assembler to more easily utilize the secluder system described in the U.S. patent application titled "Device for Secluding Optical Fibers", Ser. No. 09/317,826, filed May 25, 1999 now abandoned.

Still other advantages of the present invention will become readily apparent to those skilled in this art from the above-recited detailed description. Accordingly, the drawings and descriptions are to be regarded as illustrative in nature, and not as restrictive.

For example, the fiber winding device of the present invention can interact with a wide variety of fiber storage assemblies. For example, in the shown fiber storage assemblies, well 120 functioned as a restrainer. As used herein, the term "restrainer" can include any device or combination of devices that define a storage space, and an inner bearing surface which restrains the fiber coiled within the storage space from straightening. The storage space defined by the restrainer can take nearly any shape. Moreover, the restrainer itself can be a single device, such as an annulus, or can be a plurality of devices, such as arms or fingers. Also, the restrainer can be adapted to extend perpendicular to a base or to extend merely generally away from a base. Thus, the inner bearing surface defined by the restrainer can be one or more points, lines, or areas, or any combination thereof. In addition, the inner bearing surface can be continuous or discontinuous. Therefore, there are a number of alternative embodiments for the restrainer.

In one embodiment, the restrainer can be a well defined within a tray. Such a well can be any shape, including an elongated circle. Alternatively, the restrainer can be an elongated annulus attached to a base. In another alternative embodiment, the restrainer can comprise one or more arms or posts generally extending away from the base. In all these cases, the restrainer can prevent a fiber coiled about a spool from straightening by uncoiling.

Likewise, the spool can include any device or combination of devices defining at least one outer bearing surface which limits any fiber coiled within the restrainer such that any curvature formed in the fiber meets or exceeds the fiber's reliability-adjusted minimum bending radius. Thus, there are a number of alternative embodiments for the spool. For example, an outer perimeter defined by the spool can be continuous, or can have interruptions. In addition, the outer perimeter defined by the spool can be circular or polygonal. Moreover, the spool can be a single device, such as an annulus, or can be a plurality of devices, such as arms or fingers. Furthermore, the spool can be adapted to extend perpendicular to the tray or to extend merely generally away from the tray. Thus, either the outer bearing surface of the spool can be one or more points, lines, or areas, or any combination thereof.

The fiber winding device itself can have a number of alternative embodiments. For example, the stabilizer can be permanently attached to, or be integral to, the fiber storage assembly, including the hub, spool, and/or tray, or can be releasably fastened thereto using latching, a wedge fit, screws, bolts, or any other well known releasable attachment method. Alternatively, the stabilizer can be combined with the brace, or with the mandrel assembly. In another alternative embodiment, the fiber winding device can eliminate the brace and stabilizer, and include only the mandrel, which can be releasably fastened directly to the fiber storage assembly, including the hub, spool, and/or tray, to provide the desired anti-tipping effect. Such a releasable fastening can be accomplished by use of a wedge fit into a corresponding annular aperture. Alternatively, the mandrel can have a threaded inner circumference that threads onto a threaded outer circumference of the fiber storage assembly, including the hub, spool, and/or tray. In yet another alternative, the mandrel can have a threaded outer circumference that threads into a threaded inner circumference of the fiber storage assembly, including the hub, spool, and/or tray.

The winding surface can be any surface that limits a path of a fiber when coiled about the winding surface such that the radius of each curve of the path at least meets a reliability-adjusted minimum bending radius of the fiber. The path of the fiber can vary with the longitudinal tension in the fiber, and can include a plurality of curves.

Similarly, the disengagement surface can be any surface that limits a path of a fiber when coiled about the disengagement surface such that the radius of each curve of the path at least meets a reliability-adjusted minimum bending radius of the fiber. The path of the fiber can vary with the longitudinal tension in the fiber, and can include a plurality of curves.

What is claimed is:

1. A device for winding an optical fiber comprising:
   a fiber storage assembly; and
   a mandrel releasably fastened to said optical fiber storage assembly, said mandrel defined by a winding portion having a first circumference around which optical fiber is wound and a disengagement portion having a second circumference which is less than said first circumference such that fiber wound about said winding portion releases into said storage assembly.

2. The device of claim 1, further comprising a brace attached to said mandrel and a stabilizer coupled to said brace and said storage assembly.

3. A method for storing a fiber, said method comprising the steps of:
   engaging a mandrel with an optical fiber storage assembly, said mandrel having a first winding portion having a first cross sectional diameter and a disengagement portion having a second cross sectional diameter, wherein said second diameter is less than said first diameter;
   winding an optical fiber around said winding portion of said mandrel;
   urging the optical fiber downward along the mandrel toward said disengagement portion; and
   disposing the optical fiber off of said mandrel into a storage space defined by the optical fiber storage assembly.

4. A device for winding an optical fiber over a storage space defined by an optical fiber storage assembly, the device comprising:
   a mandrel adapted to dispose the optical fiber in a central portion of the storage space, said mandrel defining an optical fiber surface adapted to limit a path defined by the optical fiber when coiled about said optical fiber surface, the path varying with a longitudinal tension in the optical fiber, the path having a plurality of curves each having a radius, the radius of each curve of the path at least meeting a reliability-adjusted minimum bending radius of the optical fiber; said mandrel having a winding surface defined by said optical fiber surface and a disengagement surface defined by said optical fiber surface, said winding surface adapted to be positioned over the central portion, said disengagement surface having an average diameter that is smaller than a diameter of said winding surface.

5. The device of claim 4, wherein the storage space defines an elongated annular volume, a storage space inner diameter, and a storage space outer diameter, said winding surface defines an outer diameter that approximates an average of said storage space inner diameter and said storage space outer diameter.

6. The device of claim 4, wherein the storage space defines an elongated annular volume, a storage space inner diameter, and a storage space outer diameter, said disengagement surface defines an outer diameter that approximates an average of said storage space inner diameter and said storage space outer diameter.

7. The device of claim 4, wherein the storage space is defined by a restrainer and a spool, the restrainer at least partially surrounding the spool, said mandrel adapted to engage said spool.

8. The device of claim 4, wherein the storage space is defined by a optical fiber storage assembly, and said mandrel is adapted to engage said optical fiber storage assembly.

* * * * *